US007513827B2

(12) United States Patent
Baerlocher

(10) Patent No.: US 7,513,827 B2
(45) Date of Patent: Apr. 7, 2009

(54) GAMING DEVICE HAVING A WEIGHTED PROBABILITY FOR SELECTING A BONUS GAME

(75) Inventor: Anthony J. Baerlocher, Reno, NV (US)

(73) Assignee: IGT, Reno, NV (US)

( * ) Notice: Subject to any disclaimer, the term of this patent is extended or adjusted under 35 U.S.C. 154(b) by 184 days.

(21) Appl. No.: 11/534,049

(22) Filed: Sep. 21, 2006

(65) Prior Publication Data

US 2007/0015572 A1 Jan. 18, 2007

Related U.S. Application Data

(63) Continuation of application No. 10/414,638, filed on Apr. 14, 2003, now Pat. No. 7,131,908, which is a continuation of application No. 09/680,346, filed on Oct. 5, 2000, now Pat. No. 6,565,436.

(51) Int. Cl.
*A63F 13/00* (2006.01)

(52) U.S. Cl. ............................ 463/20; 463/16; 463/21; 273/139

(58) Field of Classification Search .................. 463/16, 463/19–20, 31, 17, 18, 40–43; 273/138–138.5
See application file for complete search history.

(56) References Cited

U.S. PATENT DOCUMENTS 4,624,459 A 11/1986 Kaufman
4,695,053 A 9/1987 Vazquez, Jr. et al.
4,710,873 A 12/1987 Breslow et al.
4,991,848 A 2/1991 Greenwood et al.
5,456,465 A 10/1995 Durham (Continued)

FOREIGN PATENT DOCUMENTS

DE 195 71 856 10/1996

(Continued)

OTHER PUBLICATIONS

Jazzy Jackpots Advertisements written by Atronic, published in 2000.

(Continued)

*Primary Examiner*—Ronald Laneau
*Assistant Examiner*—Ross A. Williams
(74) *Attorney, Agent, or Firm*—Bell, Boyd & Lloyd LLP

(57) ABSTRACT

A bonus scheme that has more than one and preferably at least three bonus games. Each bonus game provides excitement and enjoyment to the player via creative visual and audio displays. Each bonus game also has its own theme and may or may not be based upon schemes already known in the art of gaming devices. While the individual bonus games are not necessarily related to each other, the overall bonus scheme, preferably in the initial screen, ties the bonus games together in a master theme that provides flexibility for the individual bonus games to have their own themes. The preferred embodiment of the present invention automatically activates the bonus scheme upon a bonus triggering event. The game selects for the player one of three bonus games contained in the bonus scheme. The player plays the selected game and receives an award and the game returns the player to the base game.

66 Claims, 6 Drawing Sheets

U.S. PATENT DOCUMENTS

| | | | |
|---|---|---|---|
| 5,524,888 A | 6/1996 | Heidel | |
| 5,711,525 A | 1/1998 | Breeding | |
| 5,788,230 A | 8/1998 | Krise et al. | |
| 5,848,932 A | 12/1998 | Adams | |
| 5,873,781 A | 2/1999 | Keane | |
| 5,947,821 A | 9/1999 | Stone | |
| 5,984,781 A | 11/1999 | Sunaga | |
| 6,047,963 A | 4/2000 | Pierce et al. | |
| 6,059,289 A | 5/2000 | Vancura | |
| 6,062,980 A | 5/2000 | Luciano | |
| 6,102,400 A | 8/2000 | Scott et al. | |
| 6,126,542 A | 10/2000 | Fier | |
| 6,142,874 A | 11/2000 | Noduchi et al. | |
| 6,146,273 A | 11/2000 | Olsen | |
| 6,149,157 A | 11/2000 | Saun | |
| 6,159,097 A | 12/2000 | Gura | |
| 6,159,098 A | 12/2000 | Slomiony et al. | |
| 6,179,710 B1 | 1/2001 | Sawyer et al. | |
| 6,203,429 B1 | 3/2001 | Demar et al. | |
| 6,210,275 B1 | 4/2001 | Olsen | |
| 6,290,600 B1 | 9/2001 | Glasson | |
| 6,302,790 B1 | 10/2001 | Brossard | |
| 6,309,300 B1 | 10/2001 | Glavich | |
| 6,315,664 B1 | 11/2001 | Baerlocher et al. | |
| 6,328,649 B1 | 12/2001 | Randall | |
| 6,558,255 B2 | 5/2003 | Walker | |
| 6,569,016 B1 | 5/2003 | Baerlocher | |
| 6,634,943 B1 | 10/2003 | Baerlocher | |
| 6,645,071 B2 | 11/2003 | Perrie et al. | |
| 6,648,759 B2 | 11/2003 | Vancura | |
| 6,712,693 B1 | 3/2004 | Hettinger | |
| 7,131,908 B2 * | 11/2006 | Baerlocher | 463/20 |
| 7,329,179 B2 * | 2/2008 | Baerlocher | 463/20 |
| 2002/0010018 A1 | 1/2002 | Lemay et al. | |
| 2002/0039918 A1 | 4/2002 | Anderson et al. | |

FOREIGN PATENT DOCUMENTS

| | | |
|---|---|---|
| GB | 2 084 371 | 9/1980 |
| GB | 2 066 991 | 7/1981 |
| GB | 2 105 891 | 3/1983 |
| WO | WO 00/12186 | 3/2000 |
| WO | WO 00/32286 | 6/2000 |

OTHER PUBLICATIONS

Jazzy Jackpots Article published by Strictly Slots in Mar. 2001.
South Park Brochure published by IGT in 2000.

* cited by examiner

GAMING DEVICE HAVING A WEIGHTED PROBABILITY FOR SELECTING A BONUS GAME

PRIORITY CLAIM

This application is a continuation of, claims priority to and the benefit of U.S. patent application Ser. No. 10/414,638, filed Apr. 14, 2003, which is a continuation of, claims priority to and the benefit of U.S. patent application Ser. No. 09/680,346, filed Oct. 5, 2000, the entire contents of which are incorporated herein.

CROSS-REFERENCE TO RELATED APPLICATIONS

This application is related to the following commonly-owned patent applications: "GAMING DEVICE HAVING A MULTI-ROUND BONUS SCHEME WHEREIN EACH ROUND HAS A PROBABILITY OF SUCCESS," Ser. No. 09/688,441; "GAMING DEVICE HAVING RELATED MULTI-GAME BONUS SCHEME," Ser. No. 10/662,496; and "GAMING DEVICE HAVING RELATED MULTI-GAME BONUS SCHEME," Ser. No. 10/662,929.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device with a bonus scheme, wherein the bonus scheme contains more than one bonus games, and the bonus scheme randomly selects one of the bonus games based upon a weighted probability of selecting the bonus game.

BACKGROUND

Gaming machines currently exist with bonus schemes in which a player has one or more opportunities to obtain bonus awards or credits. Typically, gaming machines employ a single bonus game such that whenever the bonus round begins, the gaming device displays the same bonus game. While playing these bonus games may last for a relatively short or long time and may provide small or large bonus awards, the variety provided by the bonus scheme is limited. Over time, player excitement and enjoyment begin to erode in part because the player may play the same bonus game several times. Therefore, it is desirable to have more than one bonus game contained in a bonus scheme of a gaming device to provide players with a variety of bonus games, displays and outcomes.

Known gaming machines include schemes that have a plurality of different games from which the player chooses a game to play. After playing each of the games, the player likely becomes accustomed to the games, prefers one or more of the games over the others, and selects to play only the preferred games whenever a bonus triggering event occurs. The player's control over the game selection and the preference of one or more games over the others negate the variety of having multiple games. Consequently, when the player tires of the preferred games, the player will in many cases discontinue playing the gaming machine altogether.

To increase player enjoyment and excitement, it is desirable to provide players with new bonus schemes in which the players have multiple opportunities to play different bonus games. In particular, as provided by the present invention, a gaming machine that randomly selects a bonus game for the player from a number games that have different features, payouts, and difficulty levels provides the player with a variety that increases and maintains player enjoyment and excitement.

SUMMARY

The present invention provides a bonus scheme that has more than one and preferably at least three bonus games contained in one bonus scheme. Each bonus game provides excitement and enjoyment to the player via creative visual and audio displays. Each bonus game also has its own theme and may or may not be based upon schemes already known in the art of gaming devices. While the individual bonus games are not necessarily related to each other, the overall bonus scheme, preferably in the initial screen, ties the bonus games together in a master theme that provides flexibility for the individual bonus games to have their own themes.

In the preferred embodiment of the present invention, when the player receives a designated symbol during the base game operation of the gaming device, the gaming device automatically activates the bonus scheme. The bonus scheme provides a start bonus button, which enables the player to begin the bonus round. When the player presses the start bonus button, the gaming device selects for the player one of the three bonus games contained in the bonus scheme. The player plays the selected bonus game and receives a bonus award or credit and returns the player to the base game.

For example, one embodiment of the present invention displays an initial screen on the video monitor of the gaming device, which contains a road, presumably leading to a place with gaming establishments, that has three billboards. Each billboard represents, describes the nature of, and discloses the maximum possible payout for each of the bonus games contained in the bonus scheme. The billboard master theme enables the scheme to employ games having individual and unrelated themes. This embodiment provides one bonus game that involves a gaming machine, one that involves building a hamburger, and one that involves a dancing character. The bonus round triggering mechanism of this embodiment is the appearance of a designated symbol on any one of the reels of the gaming device.

The gaming machine selects the bonus game randomly based upon predetermined probabilities that the implementor programs into the memory device of the computer of the gaming machine. The probability distribution may be any distribution that suits the above described themes and that maximizes player enjoyment and excitement. The probabilities could be "flat" for example a 1 in 3 probability across the board for each of the three individual bonus games. Preferably, the distribution excites the player by providing one or more desirable games that have a lower probability of selection. A game may be desirable by having a large maximum potential payout or by paying out a relatively large bonus in a relatively large number of instances.

It is therefore an object of the present invention to provide a gaming device with a bonus scheme which provides more than one bonus game, wherein the player randomly receives one of the games based upon a weighted probability of selecting the bonus game.

Other objects, features and advantages of the invention will be apparent from the following detailed disclosure, taken in conjunction with the accompanying sheets of drawings, wherein like numerals refer to like parts, elements, components, steps and processes.

Additional features and advantages are described herein, and will be apparent from, the following Detailed Description and the figures.

DETAILED DESCRIPTION

Gaming Device and Electronics

Figure 1:
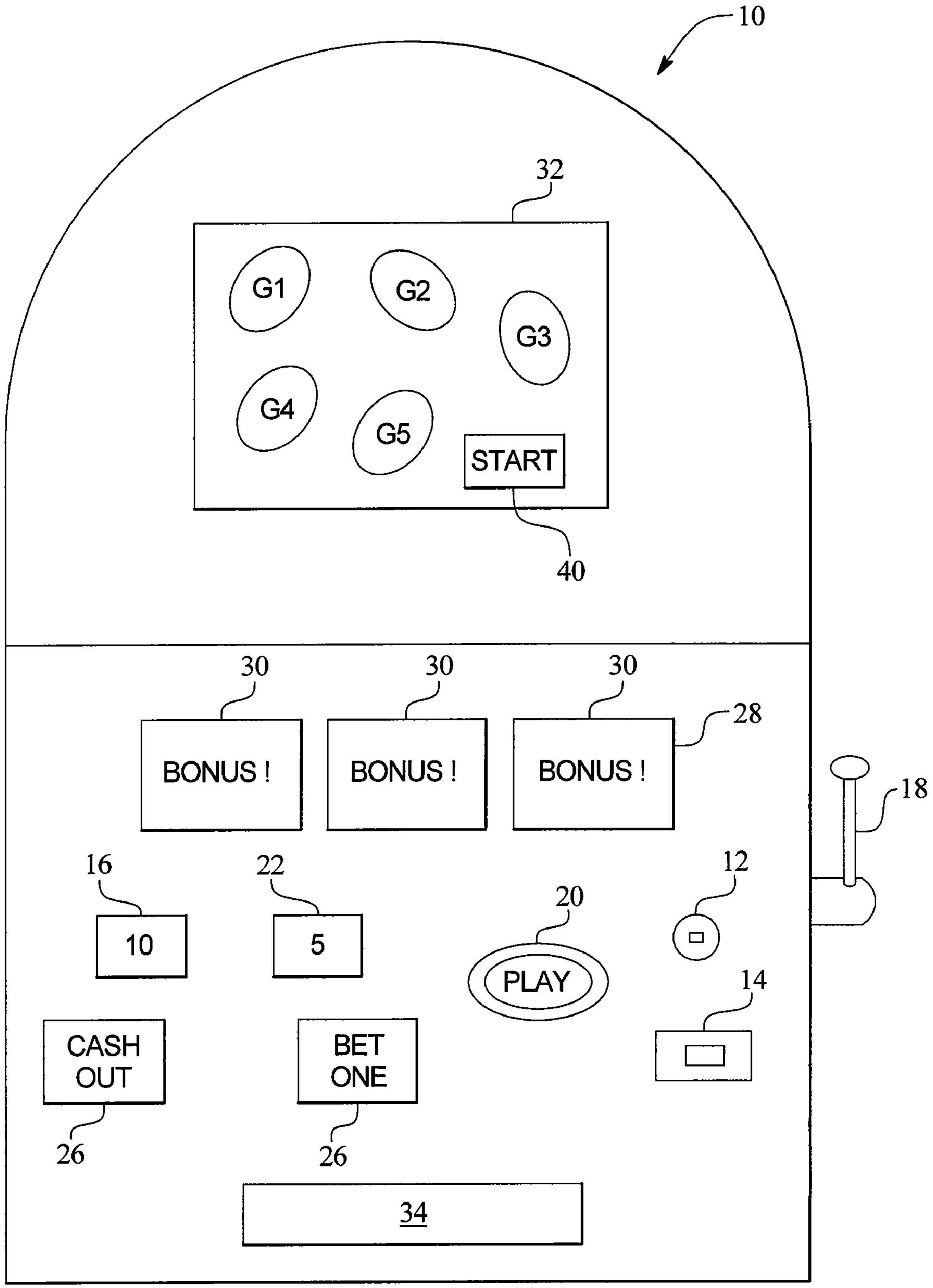
FIG. 1 is a front plan view of the gaming device of the present invention generally showing the bonus scheme of the present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

At any time during the game, a player may "cash out" and thereby receive a number of coins corresponding to the number of remaining credits by pushing a cash out button 26. When the player "cashes out," the player receives the coins in a coin payout tray 34. The gaming device 10 may employ other payout mechanisms such as credit slips redeemable by a cashier or electronically recordable cards which keep track of the player's credits.

Figure 2:
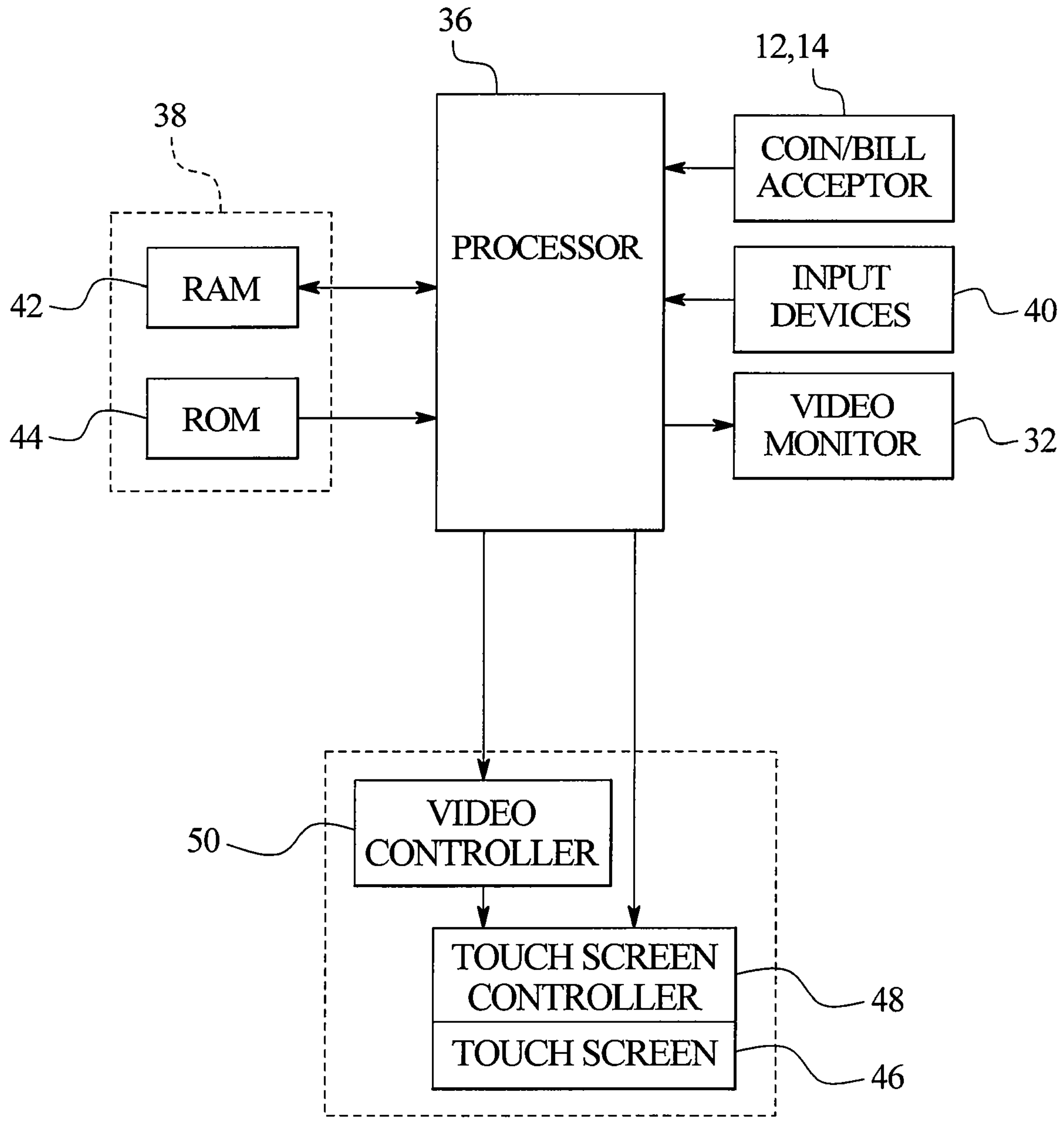
FIG. 2 is a schematic block diagram of the electronic configuration of one embodiment of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device as indicated by block 40 such as the arm 18, play button 20, the bet one button 24, and the cash out button 26. The processor 36 is preferably a microprocessor or microcontroller-based platform which is capable of displaying images, symbols and other indicia such as images of people, characters, places, things and faces of cards. The memory device 38 can include random access memory (RAM) 42 for storing event data or other data generated or used during a particular game. The memory device 38 can also include read only memory (ROM) 44 for storing program code which controls the gaming device 10 so that it plays a particular game in accordance with applicable game rules and pay tables.

As illustrated in FIG. 2, the player can use input devices as generally indicated by block 40 to input signals into gaming device 10. However, it is preferable that a touch screen 46 and an associated touch screen controller 48 are used instead of the conventional video monitor 32. Touch screen 46 and touch screen controller 48 are connected to a video controller 50 and processor 36. A player can make decisions and input signals into the gaming device 10 by touching touch screen 46 at the appropriate places. As further illustrated in FIG. 2, the processor 36 can be connected to coin slot 12 or bill acceptor 14. The processor 36 can be programmed to require a player to deposit a certain amount of money in order to start the game.

It should be appreciated that although a processor 36 and memory device 38 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like. The processor 36 and memory device 38 are together generally referred to herein as a "computer" or the "controller."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, gaming device 10 also preferably gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 also includes a display device such as a video monitor 32 shown in FIG. 1. The display device visually displays images and produces sounds, enabling the player to play the bonus round. Preferably, the qualifying condition is a predetermined combination of indicia appearing on a plurality of reels 30. As illustrated in the three reel slot machine shown in FIG. 1, the qualifying condition could be the text "BONUS!" appearing in the same location on three adjacent reels.

Bonus Scheme

FIG. 1 generally shows the bonus scheme of the present invention. The bonus scheme employs the reels 30 of display window 28. Upon obtaining the qualifying condition, such as "BONUS!" appearing in the same location on three adjacent reels, the player begins the bonus round employing the bonus scheme as shown generally in the video monitor 32. The bonus scheme preferably initially displays, in one screen and at the same time, each of a plurality of bonus games that the bonus scheme could select for the player to play. FIG. 1 also shows a general input device 40 (FIG. 2) that the player will select to start the bonus round after the gaming device 10 displays the initial bonus scheme screen in the video monitor 32.

FIG. 1 shows five games, G1 through G5, although the present invention contemplates having any number of games to increase player enjoyment and excitement. Showing the player a preview of the subject matter of the possible bonus games raises expectations and increases player enjoyment and excitement. To aid in the description of the invention, the remaining objects, features and advantages of the present invention will be discussed in conjunction with one embodiment having three bonus games. It should be appreciated the present invention can employ these objects, features and advantages with any number and type of bonus games.

Figure 3:
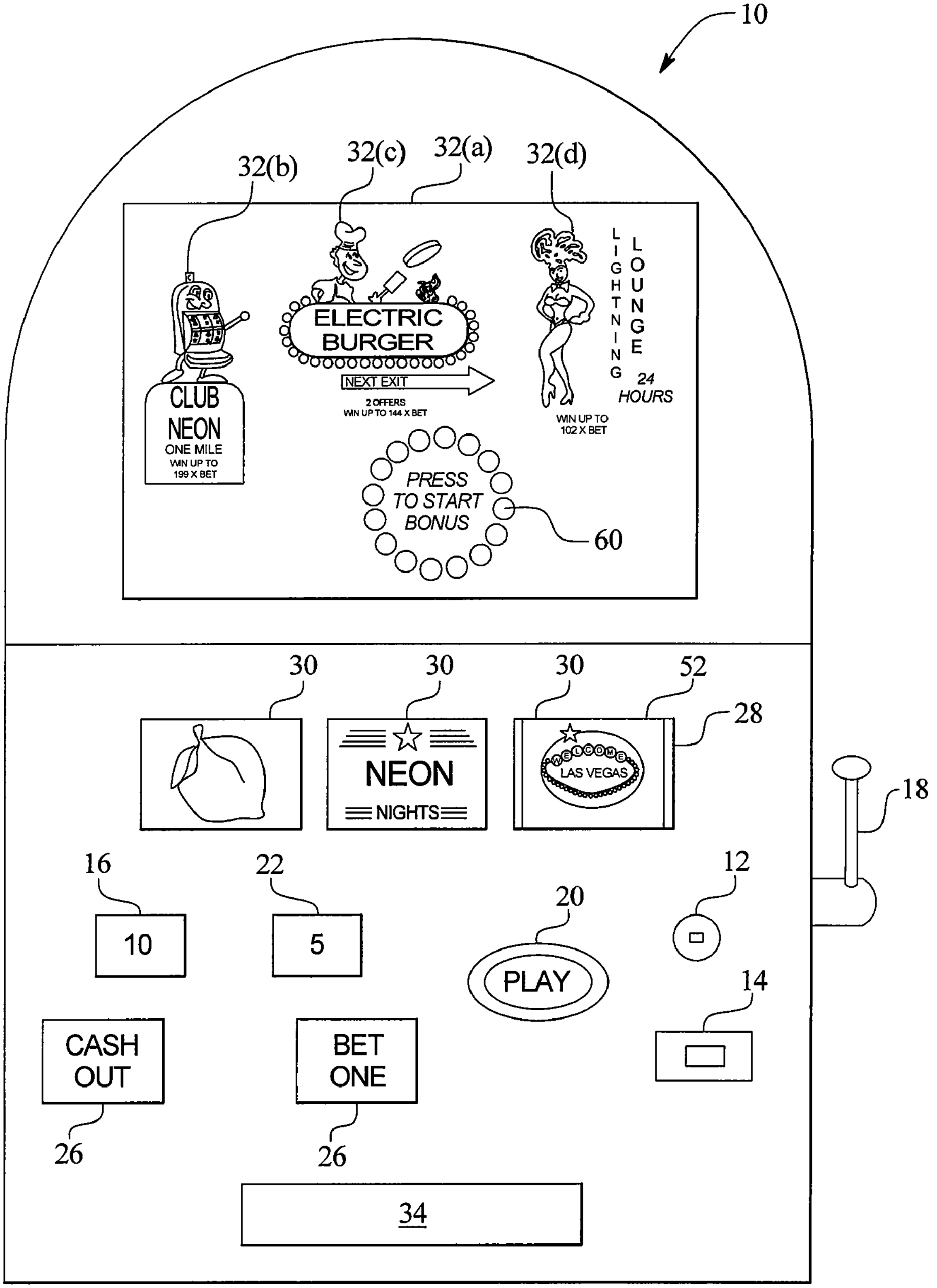
FIG. 3 is a front plan view of the gaming device of the present invention showing the initial screen of one embodiment of the bonus scheme of the present invention and the triggering base-game symbol.

FIG. 3 shows one embodiment of the present invention. If a player achieves a bonus triggering or qualifying condition while playing the game, the gaming device 10 automatically begins the bonus round of the present invention. In this embodiment, the bonus triggering or qualifying condition is a designated symbol such as a Las Vegas symbol 52 on one of the reels as shown in FIG. 3. It should be appreciated that the present invention could employ any symbol or combination of symbols.

To enhance player excitement and enjoyment, when the designated symbol 52 appears, the game preferably provides a bonus scheme initialization with suitable audio and visual signals to inform the player that a symbol or a combination of the reels 28 has invoked the bonus scheme. For example, the game could maintain a blank video monitor 32 until the bonus scheme begins, wherein the monitor flashes suitable video signals before presenting an initial bonus scheme screen 32(*a*) in video monitor 32.

The initial bonus screen 32(*a*) preferably has a theme. Using the theme, the bonus scheme preferably presents a player with a plurality of possible bonus games. The present invention contemplates displaying any number of games and any type of game. The games may be well known or have novel elements. In the preferred embodiment, the initial bonus scheme screen 32(*a*) shows a road and a plurality of billboards or signs. Each billboard or sign represents a separate bonus game, i.e.: (i) the slot coin bonus game 32(*b*); (ii) the burger flip bonus game 32(*c*); and (iii) the dancing character bonus game 32(*d*).

The bonus games can have any configuration, difficulty level, winning probabilities, and level of player interaction. The bonus games can be as simple as having the player press a single button. Alternatively, the bonus games could have multiple levels and/or multiple opportunities to win. The games can employ well known game sequences such as the pick-until routine. The games can also provide the player with a plurality of additional chances if the player does not fare well in the bonus game.

The plurality of bonus games, taken together, preferably provides a player with a range of potential winnings and also with a range in the difficulty of obtaining high payouts. From the point of view of the player, there preferably is at least one more and at least one less desirable bonus game within the group. For instance, as shown in the initial bonus scheme screen 32(*a*) of FIG. 3, the slot coin bonus game 32(*b*) enables the player to win up to 199 times the player's bet, the burger flip bonus game 32(*c*) enables the player to win up to 144 times the player's bet, and the dancing character bonus game 32(*d*) enables the player to win up to 182 times the player's bet.

The games can also vary the difficulty of obtaining high payouts, for example, the burger flip bonus game 32(*c*) preferably enables the player one opportunity to discard an initial burger and play for a second burger. It should be appreciated that the present invention contemplates providing any range of winnings and range of difficulty in accordance with a game theme and to increase player enjoyment and excitement.

The present invention assigns a probability to each displayed bonus game. When the bonus scheme is invoked, the processor 36 of the computer uses the game probabilities to select a particular bonus game from the total number of games. Preferably, the probabilities of the separate games add up to 100%. For example, the probability distribution of one embodiment could be: (i) 25% for the slot coin bonus game 32(*b*); (ii) 40% for the burger flip bonus game 32(*c*); and (iii) 35% for the dancing character bonus game 32(*d*). In this example, the game having the highest potential payout (32(*b*)) appears in the smallest percentage of bonus rounds (25%), and the game having the smallest potential payout (32(*c*)) appears in the largest percentage of bonus rounds (40%).

The implementor uses the probability distribution to create a character for the bonus scheme, wherein the scheme preferably either pays often or has high payouts. In the above example, the distribution is fairly equal among the games, but provides the highest percentage for the burger flip bonus game 32(*c*), which has lower payouts but gives the player a second chance. This distribution creates a bonus scheme that tends to pay well more often (i.e. pays above a 50% of max) rather than paying the maximum payouts.

Bonus Scheme Sequence

Referring to FIG. 3, when a player achieves a bonus triggering or qualifying condition while playing the game, such as when the reels 30 of the display window 28 show the Las Vegas symbol 52 on one of the reels. The gaming device 10 automatically begins the bonus scheme of the present invention, preferably provides a bonus scheme initialization to enhance player excitement and enjoyment, and presents the initial bonus scheme screen 32(*a*) in video monitor 32, which preferably includes a start bonus button 60. Alternatively, the start button may be electromechanical and connected to the processor 36 as an input device 40.

Figure 4:
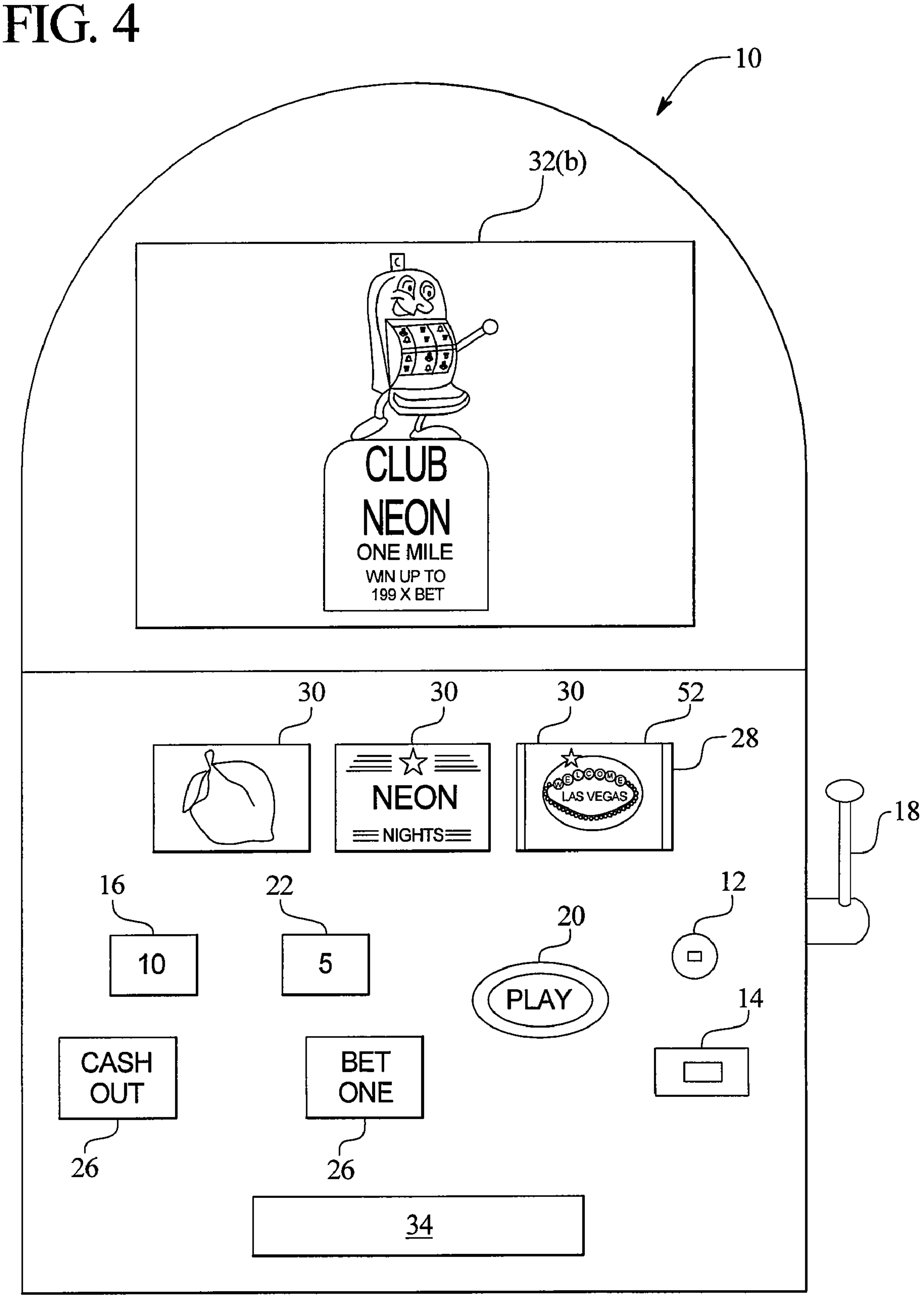
FIG. 4 is a front plan view of the gaming device of the present invention showing a first bonus game of one embodiment of the present invention.
Figure 5:
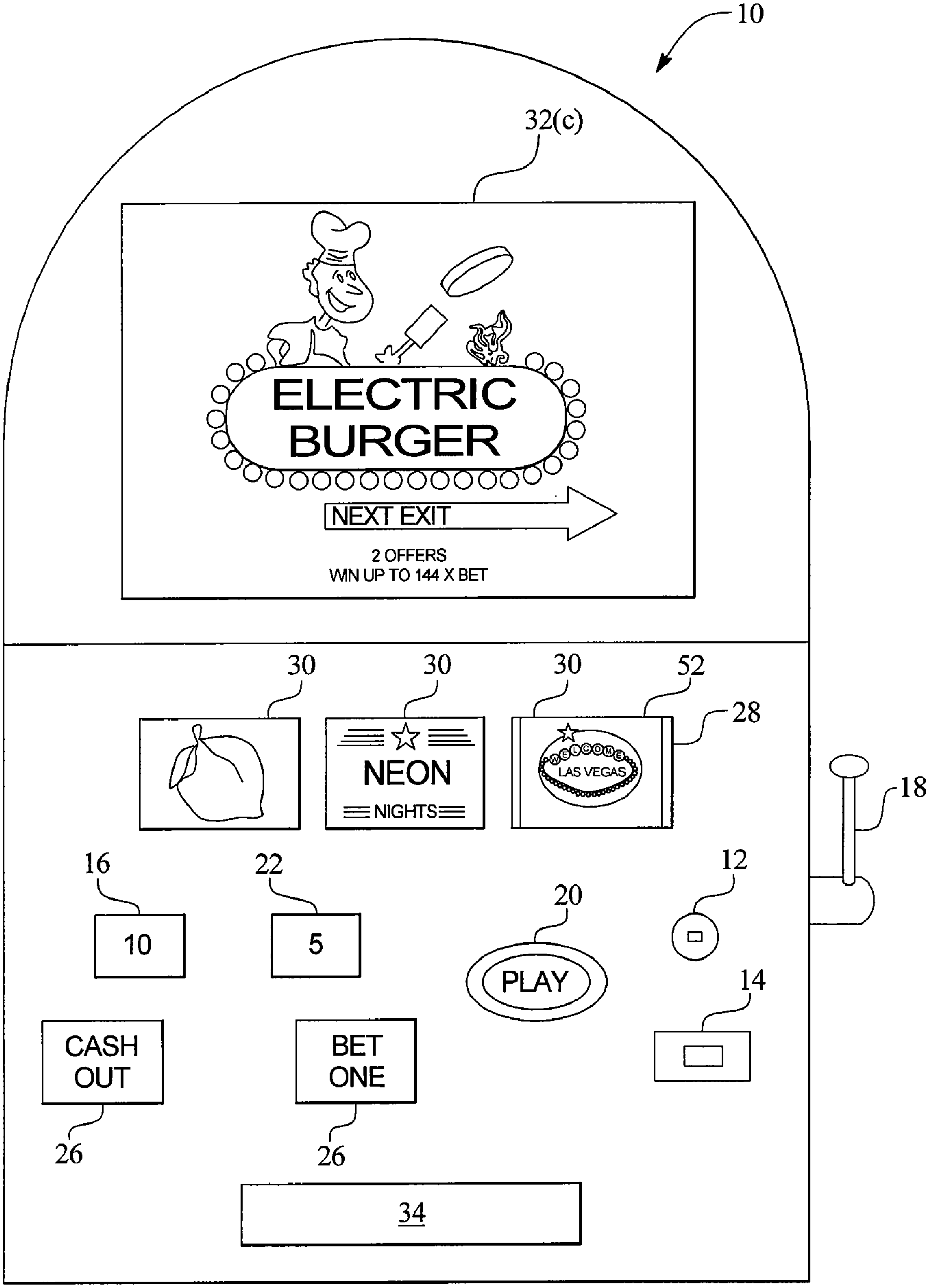
FIG. 5 is a front plan view of the gaming device of the present invention showing a second bonus game of one embodiment of the present invention.
Figure 6:
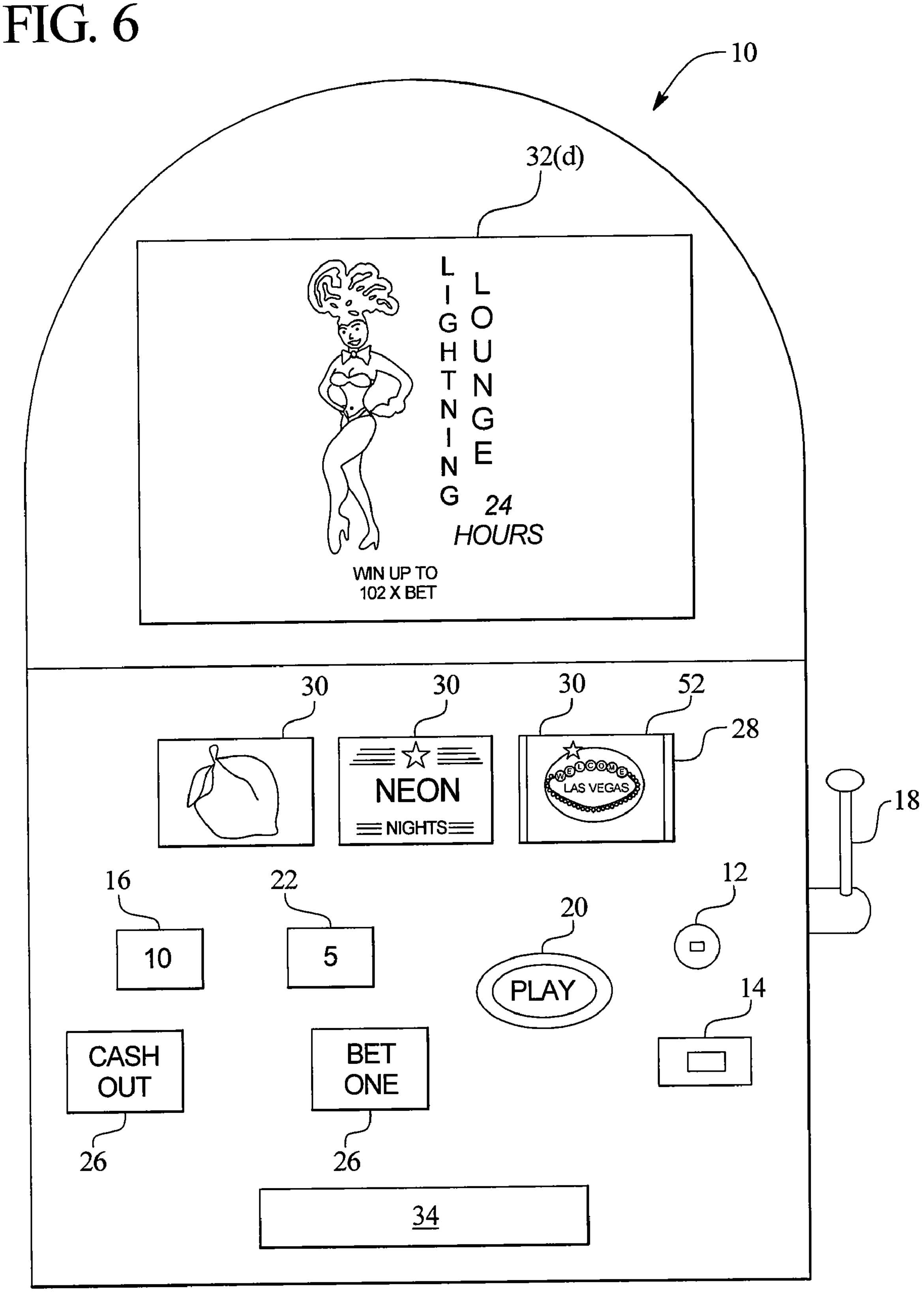
FIG. 6 is a front plan view of the gaming device of the present invention showing a third bonus game of one embodiment of the present invention.

When the player pushes the start bonus button 60, the processor 36 selects one of the bonus games using a set of probabilities for each game stored in the memory device 38 from the group of 32(*b*), 32(*c*), or 32(*d*) and displays the appropriate game screen to the player as shown respectively in FIGS. 4, 5, and 6. The player plays the selected game, and the gaming device 10 adds the payout to the player's credit display 16 and returns the player to the base game.

In one example, the player plays the base game of gaming device 10 until one of the reels shows the Las Vegas symbol. The game displays the initial bonus scheme screen 32(*a*), and the player presses the start bonus button 60. The game randomly selects and displays the burger flip bonus game 32(*c*) (FIG. 5), which has a 2 in 5 or 40% chance of being selected. The player plays the burger flip game and receives a multiplier bonus of 70 times the player's bet which is 5 credits as shown in the credit display 22. The game adds 350 base game credits (not illustrated) to the player's credit display 16 and returns the player to the base game.

The bonus scheme of the present invention contemplates awarding a higher payout when the player bets more (bet display 22 of FIGS. 1, 3, 4, 5 and 6 shows the player's bet). In this embodiment, the memory device 38 stores a set of factors that correspond to the amount bet. For instance, the memory device could store a 1.0 factor for a bet between 1 credit and 5 credits, a 1.25 factor for a bet between 6 credits and 10 credits, and a 1.5 factor for over 10 credits. In the above example, if the player bet 6 credits and received the same bonus game outcome, the game would reward the player 70×the player's bet (6)×1.25 or 525 credits. If the player bet 11 credits, the game would reward the player 70×11×1.5 or 1155 credits.

The bonus scheme of the present invention also contemplates enabling the player to have a second chance or a plurality of second chances when the bonus payout is below a predetermined level. The predetermined level is stored in memory device 38. In the above example, if the predetermined level is a 10× multiplier and the player plays the burger flip bonus game 32(*c*) and only obtains a 5× multiplier, the bonus scheme could automatically reset the bonus round or give the player the option of trying again. The bonus scheme contemplates enabling the player to have a second chance any time the player scores below the threshold or, alternatively, for only a predetermined number of consecutive times. The bonus scheme also contemplates setting any award or multiplier number as the threshold.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The plurality of bonus games increases excitement and enjoyment by providing the player with a variety of bonus games within one gaming device 10. The bonus scheme provides an incentive to the player to play the gaming device 10 until the player views and plays each bonus game. For this reason, the implementor may decide to create a particular bonus game that has a particularly large payout or that pays well (i.e. above 50% of the game's maximum payout) a particularly high number of times and that has a small chance of being selected, for example 10%.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A gaming device operable under control of at least one processor, said gaming device comprising:

a base game operable upon a player placing a wager;

a plurality of bonus games, at least two of said bonus games:

(a) being different, (b) having different average expected payouts, and (c) having different probabilities of being selected; and at least one display device;

said at least one processor programmed to operate with said at least one display device to:

(i) determine if a triggering event has occurred, said triggering event including an occurrence of a designated symbol combination in a play of the base game, and (ii) if said triggering event has occurred:

display a play of a selected one of the bonus games, said selection of said bonus game being a random selection at least in part based on said probabilities, and provide the player any bonus award resulting from said play of said selected bonus game.

2. The gaming device of claim 1, wherein each of said probabilities of being selected of each of the plurality of bonus games is different.

3. The gaming device of claim 1, wherein each of said plurality of bonus games is different.

4. The gaming device of claim 1, which includes at least one input device, and wherein the at least one processor is operable with the at least one display device and the at least one input device to enable the player to initiate said random selection of one of the bonus games.

5. The gaming device of claim 1, wherein at least two of the bonus games have different ranges of bonus awards.

6. The gaming device of claim 1, wherein each of the bonus games has a different range of bonus awards.

7. The gaming device of claim 1, wherein at least two bonus games have different maximum bonus awards.

8. The gaming device of claim 1, wherein each of the bonus games has a different maximum bonus award.

9. The gaming device of claim 1, wherein if the bonus award provided to the player is less than a predetermined value, said at least one processor is programmed to operate with said at least one display device to:

display a play of a second selected one of the bonus games, said selection of said bonus game being a random selection at least in part based on said probabilities, and provide the player any bonus award resulting from the said play of said second selected bonus game.

10. The gaming device of claim 1, wherein the average expected payout of a first of the bonus games is greater than the average expected payout of a second of the bonus games and wherein the probability of being selected of the first bonus game is less than the probability of being selected of the second bonus game.

11. A gaming device operable under control of at least one processor, said gaming device comprising:

a base game operable upon a player placing a wager;

a plurality of bonus games, at least two of said bonus games:

(a) being different, (b) having different average expected payouts, and (c) having different probabilities of being selected; and at least one display device;

said at least one processor programmed to operate with said at least one display device to:

(i) determine if a triggering event has occurred in a play of the base game, and (ii) if said triggering event has occurred:

display a play of a selected one of the bonus games, said selection of said bonus game being a random selection at least in part based on said probabilities, and provide the player any bonus award resulting from said play of said selected bonus game.

12. The gaming device of claim 11, wherein each of said probabilities of being selected of each of the plurality of bonus games is different.

13. The gaming device of claim 11, wherein each of said plurality of bonus games is different.

14. The gaming device of claim 11, which includes at least one input device, and wherein the at least one processor is operable with the at least one display device and the at least one input device to enable the player to initiate said random selection of one of the bonus games.

15. The gaming device of claim 11, wherein at least two of the bonus games have different ranges of bonus awards.

16. The gaming device of claim 11, wherein each of the bonus games has a different range of bonus awards.

17. The gaming device of claim 11, wherein at least two bonus games have different maximum bonus awards.

18. The gaming device of claim 11, wherein each of the bonus games has a different maximum bonus award.

19. The gaming device of claim 11, wherein if the bonus award provided to the player is less than a predetermined value, said at least one processor is programmed to operate with said at least one display device to:

display a play of a second selected one of the bonus games, said selection of said bonus game being a random selection at least in part based on said probabilities, and provide the player any bonus award resulting from the said play of said second selected bonus game.

20. The gaming device of claim 11, wherein the average expected payout of a first of the bonus games is greater than the average expected payout of a second of the bonus games and wherein the probability of being selected of the first bonus game is less than the probability of being selected of the second bonus game.

21. A gaming device operable under control of at least one processor, said gaming device comprising:

a base game, said base game operable upon a player placing one of at least two different wager amounts;

a plurality of bonus games, at least two of said bonus games:

(a) being different, (b) having different average expected payouts, and (c) having different probabilities of being selected; and at least one display device;

said at least one processor programmed to operate with said at least one display device to:

(i) determine if a triggering event has occurred, and (ii) if said triggering event has occurred:

display a play of a selected one of the bonus games, said selection of said bonus game being a random selection at least in part based on said probabilities, and provide the player any bonus award resulting, at least in part, from the said play of said selected bonus game, wherein the bonus award has an average expected value based at least in part on which of the different wager amounts are made.

22. The gaming device of claim 21, wherein each of said probabilities of being selected of each of the plurality of bonus games is different.

23. The gaming device of claim 21, wherein each of said plurality of bonus games is different.

24. The gaming device of claim 21, which includes at least one input device, and wherein the at least one processor is operable with the at least one display device and the at least one input device to enable the player to initiate said random selection of one of the bonus games.

25. The gaming device of claim 21, wherein at least two of the bonus games have different ranges of bonus awards.

26. The gaming device of claim 21, wherein each of the bonus games has a different range of bonus awards.

27. The gaming device of claim 21, wherein at least two bonus games have different maximum bonus awards.

28. The gaming device of claim 21, wherein each of the bonus games has a different maximum bonus award.

29. The gaming device of claim 21, wherein if the bonus award provided to the player is less than a predetermined value, said at least one processor is programmed to operate with said at least one display device to:

display a play of a second selected one of the bonus games, said selection of said bonus game being a random selection at least in part based on said probabilities, and provide the player any bonus award resulting from the said play of said second selected bonus game.

30. The gaming device of claim 21, wherein the average expected payout of a first of the bonus games is greater than the average expected payout of a second of the bonus games and wherein the probability of being selected of the first bonus game is less than the probability of being selected of the second bonus game.

31. A method of operating a gaming device, said method comprising:

(a) providing a base game operable upon a player placing a wager;

(b) providing a plurality of bonus games, at least two of said bonus games:

(1) being different, (2) having different average expected payouts, and (3) having different probabilities of being selected;

(c) determining if a triggering event has occurred, said triggering event including an occurrence of a designated symbol combination in a play of the base game; and (d) if said triggering event has occurred:

(i) displaying a play of a selected one of the bonus games, said selection of said bonus game being a random selection at least in part based on said probabilities, and (ii) providing the player any bonus award resulting from the said play of said selected bonus game.

32. The method of claim 31, wherein each of said probabilities of being selected of each of the plurality of bonus games is different.

33. The method of claim 31, wherein each of said plurality of bonus games is different.

34. The method of claim 31, which including enabling the player to initiate said random selection of one of the bonus games.

35. The method of claim 31, wherein at least two of the bonus games have different ranges of bonus awards.

36. The method of claim 31, wherein each of the bonus games has a different range of bonus awards.

37. The method of claim 31, wherein at least two bonus games have different maximum bonus awards.

38. The method of claim 31, wherein each of the bonus games has a different maximum bonus award.

39. The method of claim 31, which includes, if the bonus award provided to the player is less than a predetermined value, displaying a play of a second selected one of the bonus games, said selection of said bonus game being a random selection at least in part based on said probabilities, and providing the player any bonus award resulting from the said play of said second selected bonus game.

40. The method of claim 31, wherein the average expected payout of a first of the bonus games is greater than the average expected payout of a second of the bonus games and wherein the probability of being selected of the first bonus game is less than the probability of being selected of the second bonus game.

41. The method of claim 31, which is provided through a data network.

42. The method of claim 41, wherein the data network is an internet.

43. A method of operating a gaming device, said method comprising:

(a) providing a base game operable upon a player placing a wager;

(b) providing a plurality of bonus games, at least two of said bonus games:

(1) being different, (2) having different average expected payouts, and (3) having different probabilities of being selected;

(c) determining if a triggering event has occurred in a play of the base game; and (d) if said triggering event has occurred:

(i) displaying a play of a selected one of the bonus games, said selection of said bonus game being a random selection at least in part based on said probabilities, and (ii) providing the player any bonus award resulting from the said play of said selected bonus game.

44. The method of claim 43, wherein each of said probabilities of being selected of each of the plurality of bonus games is different.

45. The method of claim 43, wherein each of said plurality of bonus games is different.

46. The method of claim 43, which includes enabling the player to initiate said random selection of one of the bonus games.

47. The method of claim 43, wherein at least two of the bonus games have different ranges of bonus awards.

48. The method of claim 43, wherein each of the bonus games has a different range of bonus awards.

49. The method of claim 43, wherein at least two bonus games have different maximum bonus awards.

50. The method of claim 43, wherein each of the bonus games has a different maximum bonus award.

51. The method of claim 43, which includes, if the bonus award provided to the player is less than a predetermined value, displaying a play of a second selected one of the bonus games, said selection of said bonus game being a random selection at least in part based on said probabilities, and providing the player any bonus award resulting from the said play of said second selected bonus game.

52. The method of claim 43, wherein the average expected payout of a first of the bonus games is greater than the average expected payout of a second of the bonus games and wherein the probability of being selected of the first bonus game is less than the probability of being selected of the second bonus game.

53. The method of claim 43, which is provided through a data network.

54. The method of claim 53, wherein the data network is an internet.

55. A method of operating a gaming device, said method comprising:

(a) providing a base game, said base game operable upon a player placing one of at least two different wager amounts;

(b) providing a plurality of bonus games, at least two of said bonus games:

(1) being different, (2) having different average expected payouts, and (3) having different probabilities of being selected;

(c) determining if a triggering event has occurred, and (d) if said triggering event has occurred:

(i) displaying a play of a selected one of the bonus games, said selection of said bonus game being a random selection at least in part based on said probabilities, and (ii) providing the player any bonus award resulting, at least in part, from the said play of said selected bonus game, wherein the bonus award has an average expected value based at least in part on which of the different wager amounts are made.

56. The method of claim 55, wherein each of said probabilities of being selected of each of the plurality of bonus games is different.

57. The method of claim 55, wherein each of said plurality of bonus games is different.

58. The method of claim 55, which includes the player to initiate said random selection of one of the bonus games.

59. The method of claim 55, wherein at least two of the bonus games have different ranges of bonus awards.

60. The method of claim 55, wherein each of the bonus games has a different range of bonus awards.

61. The method of claim 55, wherein at least two bonus games have different maximum bonus awards.

62. The method of claim 55, wherein each of the bonus games has a different maximum bonus award.

63. The method of claim 55, which includes, if the bonus award provided to the player is less than a predetermined value, displaying a play of a second selected one of the bonus games, said selection of said bonus game being a random selection at least in part based on said probabilities, and providing the player any bonus award resulting from the said play of said second selected bonus game.

64. The method of claim 55, wherein the average expected payout of a first of the bonus games is greater than the average expected payout of a second of the bonus games and wherein the probability of being selected of the first bonus game is less than the probability of being selected of the second bonus game.

65. The method of claim 55, which is provided through a data network.

66. The method of claim 65, wherein the data network is an internet.

* * * * *

UNITED STATES PATENT AND TRADEMARK OFFICE

CERTIFICATE OF CORRECTION

PATENT NO. : 7,513,827 B2
APPLICATION NO. : 11/534049
DATED : April 7, 2009
INVENTOR(S) : Anthony J. Baerlocher It is certified that error appears in the above-identified patent and that said Letters Patent is hereby corrected as shown below:

IN THE CLAIMS:

Claim 1, Column 8, Lines 27-32, delete:
"a base game operable upon a player placing a wager;
a plurality of bonus games, at least two of said bonus games:
(a) being different,
(b) having different average expected payouts, and
(c) having different probabilities of being selected; and".

Claim 1, Column 8, between Lines 35 and 36, insert --(i) display a play of a base game upon a player placing a wager,--.

Claim 1, Column 8, Line 36, change "(i)" to --(ii)--.

Claim 1, Column 8, Line 38, change "combination in a play" to --combination in the play--.

Claim 1, Column 8, Line 40, change "(ii)" to --(iii)--.

Claim 1, Column 8, Lines 41-44, change "display a play of a selected one of the bonus games, said selection of said bonus game being a random selection at least in part based on said probabilities, and" to --display a play of a selected one of a plurality of bonus games, at least two of said bonus games: (a) being different, (b) having different average expected payouts, and (c) having different probabilities of being automatically selected, and said selection of said bonus game being a random selection at least in part based on said probabilities, and--.

Claim 21, Column 10, Lines 3-9, delete:
"a base game, said base game operable upon a player placing one of at least two different wager amounts;
a plurality of bonus games, at least two of said bonus games:

Signed and Sealed this
Sixteenth Day of September, 2014

Michelle K. Lee

Michelle K. Lee
*Deputy Director of the United States Patent and Trademark Office*

(a) being different,
(b) having different average expected payouts, and
(c) having different probabilities of being selected; and".

Claim 21, Column 10, between Lines 12 and 13, insert --(i) display a play of a base game upon a player placing one of at least two different wager amounts,--.

Claim 21, Column 10, Line 13, change "(i) determine if a triggering event has occurred:" to --(ii) determine if a triggering event has occurred, said triggering event including an occurrence of a designated symbol combination in the play of the base game, and--.

Claim 21, Column 10, Line 14, change "(ii)" to --(iii)--.

Claim 21, Column 10, Lines 15-18, change "display a play of a selected one of the bonus games, said selection of said bonus game being a random selection at least in part based on said probabilities, and" to --display a play of a selected one of a plurality of bonus games, at least two of said bonus games: (a) being different, (b) having different average expected payouts, and (c) having different probabilities of being automatically selected, and said selection of said bonus game being a random selection at least in part based on said probabilities, and--.

Claim 31, Column 10, Lines 61-62, change "(a) providing a base game operable upon a player placing a wager;" to --(a) upon a player placing a wager, causing at least one display device to display a play of a base game;--.

Claim 31, Column 10, Line 67, change "being selected;" to --being automatically selected;--.

Claim 31, Column 11, Line 3, change "combination in a play of" to --combination in the play of--.

Claim 31, Column 11, Lines 5-8, change "(I) displaying a play of a selected one of the bonus games, said selection of said bonus game being a random selection at least in part based on said probabilities, and" to --(i) causing the at least one display device to display a play of a selected one of the bonus games, said selection of said bonus game being a random selection at least in part based on said probabilities, and--.

Claim 43, Column 11, Lines 46-47, change "(a) providing a base game operable upon a player placing a wager;" to --(a) upon a player placing a wager, causing at least one display device to display a play of a base game;--.

Claim 43, Column 11, Line 52, change "being selected" to --being automatically selected--.

Claim 43, Column 11, Lines 53-54, change "determining if a triggering event has occurred in a play of the base game; and" to --(c) determining if a triggering event has occurred, said triggering event including an occurrence of a designated symbol combination in the play of the base game; and--.

Claim 43, Column 11, Lines 58-59, change “(i) displaying a play of a selected one of the bonus games, said selection of said bonus game being a random selection at least in part based on said probabilities, and” to --(i) causing the at least one display device to display a play of a selected one of the bonus games, said selection of said bonus game being a random selection at least in part based on said probabilities, and--.

Claim 55, Column 12, Lines 32-34, change “(a) providing a base game, said base game operable upon a player placing one of at least two different wager amounts;” to --(a) upon a player placing one of at least two different wager amounts, causing at least one display device to display a play of a base game;--.

Claim 55, Column 12, Line 39, change “being selected;” to --being automatically selected;--.

Claim 55, Column 12, Line 40, change “(c) determining if a triggering event has occurred, and” to --determining if a triggering event has occurred, said triggering event including an occurrence of a designated symbol combination in the play of the base game, and--.

Claim 55, Column 12, Lines 42-45, change “(i) displaying a play of a selected one of the bonus games, said selection of said bonus game being a random selection at least in part based on said probabilities, and” to --(i) causing the at least one display device to display a play of a selected one of the bonus games, said selection of said bonus game being a random selection at least in part based on said probabilities, and--.

UNITED STATES PATENT AND TRADEMARK OFFICE

CERTIFICATE OF CORRECTION

PATENT NO. : 7,513,827 B2
APPLICATION NO. : 11/534049
DATED : April 7, 2009
INVENTOR(S) : Anthony J. Baerlocher It is certified that error appears in the above-identified patent and that said Letters Patent is hereby corrected as shown below:

IN THE CLAIMS:

Claim 1, Column 8, Lines 27-32, delete:
"a base game operable upon a player placing a wager;
a plurality of bonus games, at least two of said bonus games:
(a) being different,
(b) having different average expected payouts, and
(c) having different probabilities of being selected; and".

Claim 1, Column 8, between Lines 35 and 36, insert --(i) display a play of a base game upon a player placing a wager,--.

Claim 1, Column 8, Line 36, change "(i)" to --(ii)--.

Claim 1, Column 8, Line 38, change "combination in a play" to --combination in the play--.

Claim 1, Column 8, Line 40, change "(ii)" to --(iii)--.

Claim 1, Column 8, Lines 41-44, change "display a play of a selected one of the bonus games, said selection of said bonus game being a random selection at least in part based on said probabilities, and" to --display a play of a selected one of a plurality of bonus games, at least two of said bonus games: (a) being different, (b) having different average expected payouts, and (c) having different probabilities of being automatically selected, and said selection of said bonus game being a random selection at least in part based on said probabilities, and--.

This certificate supersedes the Certificate of Correction issued September 16, 2014.

Signed and Sealed this
Twentieth Day of October, 2015

Michelle K. Lee

Michelle K. Lee
*Director of the United States Patent and Trademark Office*

Claim 21, Column 10, Lines 3-9, delete:
"a base game, said base game operable upon a player placing one of at least two different wager amounts;
a plurality of bonus games, at least two of said bonus games:
(a) being different,
(b) having different average expected payouts, and
(c) having different probabilities of being selected; and".

Claim 21, Column 10, between Lines 12 and 13, insert --(i) display a play of a base game upon a player placing one of at least two different wager amounts,--.

Claim 21, Column 10, Line 13, change "(i) determine if a triggering event has occurred:" to --(ii) determine if a triggering event has occurred, said triggering event including an occurrence of a designated symbol combination in the play of the base game, and--.

Claim 21, Column 10, Line 14, change "(ii)" to --(iii)--.

Claim 21, Column 10, Lines 15-18, change "display a play of a selected one of the bonus games, said selection of said bonus game being a random selection at least in part based on said probabilities, and" to --display a play of a selected one of a plurality of bonus games, at least two of said bonus games: (a) being different, (b) having different average expected payouts, and (c) having different probabilities of being automatically selected, and said selection of said bonus game being a random selection at least in part based on said probabilities, and--.

Claim 31, Column 10, Lines 61-62, change "(a) providing a base game operable upon a player placing a wager;" to --(a) upon a player placing a wager, causing at least one display device to display a play of a base game;--.

Claim 31, Column 10, Line 67, change "being selected;" to --being automatically selected;--.

Claim 31, Column 11, Line 3, change "combination in a play of" to --combination in the play of--.

Claim 31, Column 11, Lines 5-8, change "(I) displaying a play of a selected one of the bonus games, said selection of said bonus game being a random selection at least in part based on said probabilities, and" to --(i) causing the at least one display device to display a play of a selected one of the bonus games, said selection of said bonus game being a random selection at least in part based on said probabilities, and--.

Claim 43, Column 11, Lines 46-47, change "(a) providing a base game operable upon a player placing a wager;" to --(a) upon a player placing a wager, causing at least one display device to display a play of a base game;--.

Claim 43, Column 11, Line 52, change "being selected" to --being automatically selected--.

Claim 43, Column 11, Lines 53-54, change "determining if a triggering event has occurred in a play of the base game; and" to --(c) determining if a triggering event has occurred, said triggering event including an occurrence of a designated symbol combination in the play of the base game; and--.

Claim 43, Column 11, Lines 56-59, change "(i) displaying a play of a selected one of the bonus games, said selection of said bonus game being a random selection at least in part based on said probabilities, and" to --(i) causing the at least one display device to display a play of a selected one of the bonus games, said selection of said bonus game being a random selection at least in part based on said probabilities, and--.

Claim 55, Column 12, Lines 32-34, change "(a) providing a base game, said base game operable upon a player placing one of at least two different wager amounts;" to --(a) upon a player placing one of at least two different wager amounts, causing at least one display device to display a play of a base game;--.

Claim 55, Column 12, Line 39, change "being selected;" to --being automatically selected;--.

Claim 55, Column 12, Line 40, change "(c) determining if a triggering event has occurred, and" to --determining if a triggering event has occurred, said triggering event including an occurrence of a designated symbol combination in the play of the base game, and--.

Claim 55, Column 12, Lines 42-45, change "(i) displaying a play of a selected one of the bonus games, said selection of said bonus game being a random selection at least in part based on said probabilities, and" to --(i) causing the at least one display device to display a play of a selected one of the bonus games, said selection of said bonus game being a random selection at least in part based on said probabilities, and--.

UNITED STATES PATENT AND TRADEMARK OFFICE

CERTIFICATE OF CORRECTION

PATENT NO. : 7,513,827 B2
APPLICATION NO. : 11/534049
DATED : April 7, 2009
INVENTOR(S) : Anthony J. Baerlocher It is certified that error appears in the above-identified patent and that said Letters Patent is hereby corrected as shown below:

IN THE CLAIMS

In Claim 11, Column 9, Lines 16-21, delete:
“a base game operable upon a player placing a wager;
a plurality of bonus games, at least two of said bonus games:
(a) being different,
(b) having different average expected payouts, and
(c) having different probabilities of being selected; and”.
In Claim 11, Column 9, between Lines 24 and 25, insert --(i) display a play of a base game upon a player placing a wager,--.
In Claim 11, Column 9, Lines 25-26, change “(i) determine if a triggering event has occurred in a play of the base game, and” to --(ii) determine if a triggering event has occurred, said triggering event including an occurrence of a designated symbol combination in the play of the base game, and--.
In Claim 11, Column 9, Line 27, change “(ii)” to --(iii)--.
In Claim 11, Column 9, Lines 28-31, change “display a play of a selected one of the bonus games, said selection of said bonus game being a random selection at least in part based on said probabilities, and” to --display a play of a selected one of a plurality of bonus games, at least two of said bonus games: (a) being different, (b) having different average expected payouts, and (c) having different probabilities of being automatically selected, and said selection of said bonus game being a random selection at least in part based on said probabilities, and--.

Signed and Sealed this
Sixteenth Day of February, 2016

Michelle K. Lee

Michelle K. Lee
*Director of the United States Patent and Trademark Office*